United States Patent [19]

Tompkins et al.

[11] 4,227,375
[45] Oct. 14, 1980

[54] DESICCANT THERMAL ENERGY STORAGE SYSTEM FOR COMPACT HEATING AND COOLING

[76] Inventors: Leo Tompkins, 127 Wacaster St., Jackson, Miss. 39209; Harold Strain, 345 Woodstone Rd., F-5, Clinton, Miss. 39056

[21] Appl. No.: 829,106

[22] Filed: Aug. 30, 1977

[51] Int. Cl.² ........................ F25B 27/00; F25D 23/00
[52] U.S. Cl. ........................................... 62/2; 55/390; 62/271; 165/4
[58] Field of Search ............... 165/4; 55/390; 62/271, 62/2

[56] References Cited

U.S. PATENT DOCUMENTS

| | | | |
|---|---|---|---|
| 1,819,643 | 8/1931 | Fleisher | 62/271 X |
| 1,820,199 | 8/1931 | Riley | 165/4 |
| 2,075,036 | 3/1937 | Hollis | 62/271 X |
| 2,211,033 | 8/1940 | Shipman | 62/271 X |
| 2,344,384 | 3/1944 | Altenkirch | 62/271 X |
| 2,811,223 | 10/1957 | Newton | 62/271 X |
| 3,119,673 | 1/1964 | Asker et al. | 62/271 X |
| 3,190,343 | 6/1965 | Hussmann | 165/4 X |
| 3,401,530 | 9/1968 | Meckler | 62/271 X |
| 3,619,987 | 11/1971 | Colvin et al. | 55/390 X |
| 3,733,791 | 5/1973 | Dravnieks | 55/390 |
| 3,757,492 | 9/1973 | Graff | 55/390 X |
| 3,828,528 | 8/1974 | Wail | 55/390 X |
| 3,844,737 | 10/1974 | Macriss et al. | 55/390 X |
| 3,889,742 | 6/1975 | Rush et al. | 55/390 |
| 3,920,066 | 11/1975 | Kirchhoff | 165/4 |
| 4,017,285 | 4/1977 | Edwards | 62/2 |
| 4,023,375 | 5/1977 | Chinnappa et al. | 62/2 |
| 4,081,024 | 3/1978 | Rush et al. | 61/2 |

FOREIGN PATENT DOCUMENTS 915021 7/1954 Fed. Rep. of Germany ............. 62/271
867555 5/1961 United Kingdom ..................... 62/271

*Primary Examiner*—Leslie Braun
*Attorney, Agent, or Firm*—Breneman, Kane & Georges

[57] ABSTRACT

A plurality of individual, isolatable storage bins carrying a desiccant such as silicon gel are selectively placed in communication with a heat reclaim/solar collector within a gas circulation loop to permit the desiccant material to be dried and to store heat almost indefinitely in its dry state. The bins may be selectively connected within a second circulation loop, including a room to be conditioned such that a second gas circulated over the desiccant and to the room varies the moisture content of the desiccant to release heat and to thereby effect controlled heating or cooling of the air within the room, as needed, and irrespective operation of the heat reclaim/solar collector.

10 Claims, 1 Drawing Figure

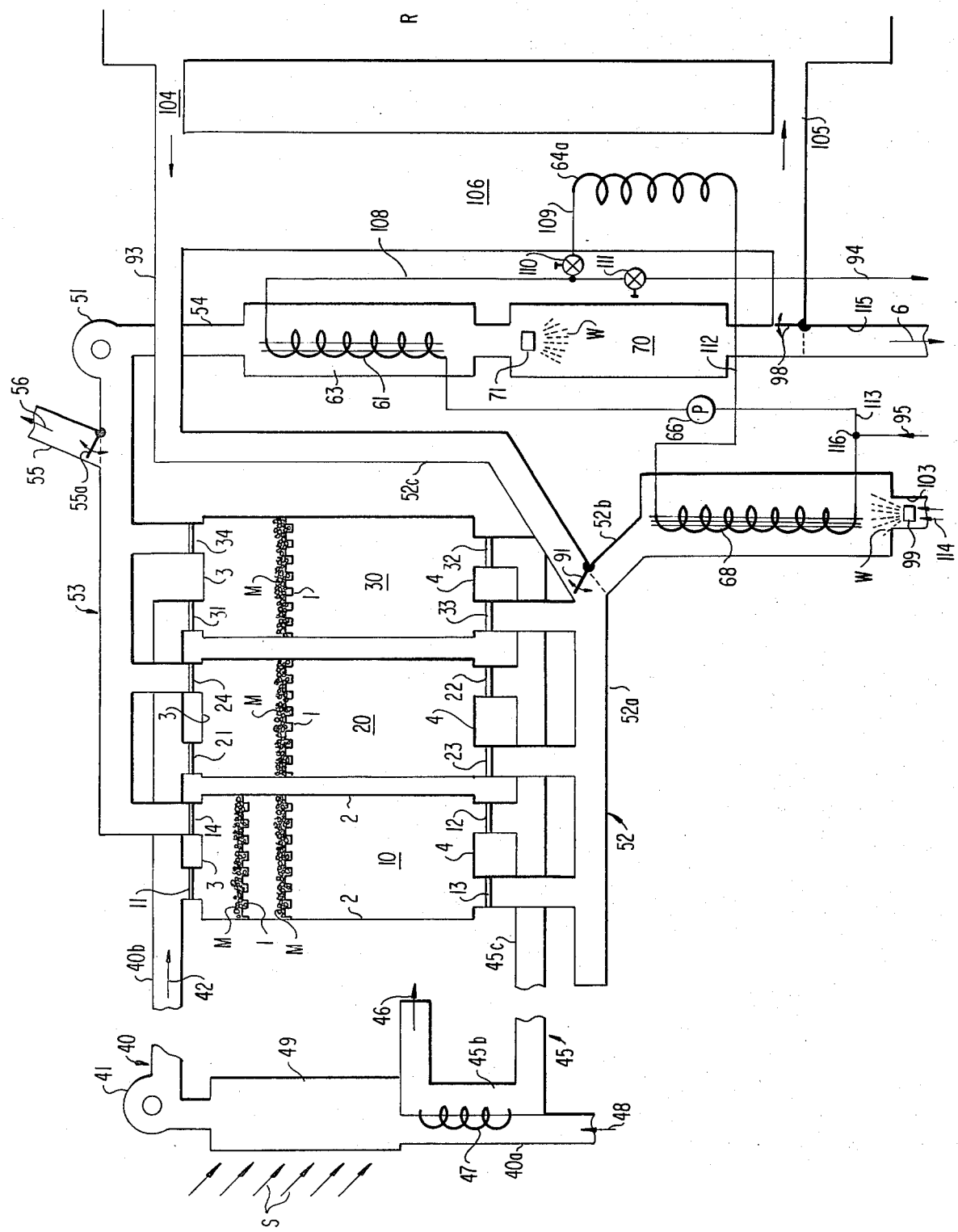

DESICCANT THERMAL ENERGY STORAGE SYSTEM FOR COMPACT HEATING AND COOLING

BACKGROUND OF THE INVENTION

Field Of The Invention

This invention relates to heating, cooling and air conditioning systems, and more broadly to systems supplying a source of hot, dry gas available upon demand and irrespective of availability of conventional energy heat sources.

Nominally free energy sources such as the sun, waste heat from commercial buildings and industrial operations by way of heat reclaim can augment and supplement conventional heating and cooling systems or systems designed to provide hot, dry gas, such as air, to dry hay, seeds, clothes, lumber, various paint finishes, etc. at a steady rate or when needed, particularly where the original source of heat is not available when and at the time the energy is needed.

Conventionally, solar systems have employed water, rocks, earth, etc., as means to store heat for future use, but such storage systems are highly inefficient and are rather massive in size.

Desiccants constitute materials which attract moisture to their surfaces. Practical desiccants constitute generally granular material having many openings and pores such that the surface area exposed to the gas or air inside the grain is many times the area of the grain exterior or what appears to be the surface of the grain. Given some time, water molecules can occupy all of the outside and inside surfaces allowing the material to hold large quantities of water and surface bondage without showing wetness and before loosing its attraction for additional moisture.

For instance, a pound of silica gel can absorb 50% of its dry weight in water without becoming damp to the feel and before loosing all of its attraction for moisture. Activated aluminate can hold 30% of its dry weight in water in a similar manner. These figures are directed only to the moisture which may be held to the surfaces of these elements by an attraction known as surface absorption. This attraction is greatest when the material is dried of all attached moisture, and such desiccants readily attract water from the humidity of the gas, such as air, until the gas is at least as dry as the desiccant. This application is directed to the employment of a readily available gas, such as air, as the circulation media, and it is intended that reference to air within this application infers that the air may be readily substituted by other gases. Likewise, dry gases will evaporate water from that held by the surface of the desiccants until the desiccant is as dry as the gas. Large beds of desiccants are often used for exact humidity control because these characteristics can stabilize the moisture in air passing over them.

The measure of dryness that most closely parallels in desiccants and in gases is the psychometric depression, with a number of degrees that the wet bulb of a thermometer drops below the dry bulb of another when the wet bulb is wetted with distilled water and a gas is circulated over both bulbs. From this, the dryness of both air and desiccant may be stated in comparable terms. When a desiccant and a gas are in equilibrium, they are said to have the same depression.

Water vapor, when attracted to the surface of a desiccant, takes on liquid form or state, and the heat of vaporization is released, plus a 20% wetting factor, amounting to about 1,200 BTU's per pound of water condensed. Thus, one pound of a very dry silica gel (having a depression of 60° F.) will release 600 BTU's from saturated air where all of the attraction for water is used. Likewise, the same amount of heat is absorbed by the water vapor when spent desiccant (wet) is dried by air having a depression of 60° or better, causing the air and the desiccant to be cooled according to the heat so removed. The sensible heat goes into the vaporization of water, and in separating the water from the desiccant, the reverse of the wetting process.

This principle works as well when the material is only partially cycled, either taking on or giving up moisture—that is, is neither completely dry nor completely wet. The amount of heat released or absorbed by these processes is reduced by the portion that the full cycle is not used. The full cycle value for activated aluminate is approximately 360 BTU's.

The present invention, therefore, is directed to the utilization of desiccants to store energy from inadequate, periodic or undependable sources of heat for delivery in the amount needed and as the need arises, permitting a storage system due to the characteristics of the desiccants which is of reduced size, weight with a high percentage of recovery, even after long storage.

It is an object of the present invention to provide a heating and/or cooling system of this type in which energy may be supplied to the system and the desiccant dried by solar heat, the waste heat from a refrigeration condenser, waste heat from a stove functioning in cooking and heating processes, waste heat from industrial processes and by drying gases from whatever source, even if the gases are not hot. Desiccant material so dried may be stored almost indefinitely in its dry state with little loss of potential energy return, and the energy may be used at any time desired to produce drying air, heat or cooling for room conditioning of living space, as well as for various other purposes.

SUMMARY OF THE INVENTION

In one form, the present invention constitutes a controlled heating and cooling system for conditioning a room or the like, the system comprising at least one isolatable desiccant storage bin containing desiccant material, charging circuit means for varying the moisture content of the desiccant within the bin, and withdrawal circuit means to selectively effect circulation of a gas over said desiccant and to the room to be conditioned and to thereby vary its moisture content and temperature to selectively effect heating or cooling of the room.

Preferably, a plurality of separate desiccant storage bins are provided, and the charging circuit means to selectively vary the moisture content of the desiccant comprises a first duct means connected to said storage bins and being open to a source of gas, a blower means mounted to said first duct means for forcing gas through said first duct means and said bin, valve means for selectively closing off said bins to said first duct means, and heating means for heating said gas within said first duct means upstream of said bins. Said first duct means further provides for discharging said gas passing through said bins, said first duct means includes a duct means portion leading from said storage bins for discharging said gas after passing over said desiccant, and wherein said system further includes a regenerative heat exchanger within said first duct means upstream of said heating means and another portion. Further, valve means are provided to close off said second duct means to said bins.

Further, preferably, second duct means are provided for connecting said storage bins to said room to be conditioned, said second duct means including valve means for selectively closing off said bins to said second duct means, such that those storage bins having highly dry desiccant may be selectively communicated to said room to be conditioned for absorbing moisture of the gas circulating over the desiccant to raise the temperature of the gas passing to the room.

Said second duct means may include a first heat exchange chamber for removing thermal energy of the heated gas discharging from the storage bins and isolated from the portion of the second means in communication with said room to be conditioned. Said second duct means may further comprise a bypass portion for circulating gas to and from said room, with said bypass portion further comprising a room heat exchange coil connected to the heat exchange coil of said first heat exchange chamber, whereby the gas within said room to be conditioned is indirectly heated by the air circulated from said storage bins through said second duct means.

BRIEF DESCRIPTION OF THE DRAWING

The single FIGURE is a schematic diagram of a preferred embodiment of the compact desiccant heat storage system of the present invention for selective heating and cooling.

DESCRIPTION OF THE PREFERRED EMBODIMENT

The system of the present invention, as illustrated in the FIGURE, is designed preferably to supply either heat or cool to a room or other space to be conditioned as at R, from desiccant materials indicated generally at M constituting silica gel or the like carried by individual trays 1 with the desiccant M being selectively, intermittently and randomly dried by means of a heat reclaim/solar collector indicated generally at 49 and responsive, for instance, for direct solar radiation as provided by arrows S. The room R, the heat reclaim/solar collector 49 and the storage bins indicated generally at 10, 20 and 30 carrying the silica gel desiccant material are suitably connected by a duct work. The storage bins each comprise rectangular containers having laterally opposed side walls 2 and top and bottom walls, 3 and 4, respectively. Mounted within upper wall 3 are gate valves 11 and 14 for bin 10, and within lower wall 4 are gates valves 12 and 13. Bin 20 includes gate valves 21 and 24 within its upper wall, and gate valves 22 and 23 within its lower wall, while bin 30 is provided with gate valves 31 and 34 within its upper wall and valves 32 and 33 within its lower wall. The gate valves permit the storage bins to be under selective communication alternately to either the duct means of the charging circuit or to the duct means of the withdrawal circuit, respectively. The charging circuit includes a supply duct 40 and return duct 45, while the withdrawal circuit includes supply duct 53 and return duct 52. The charging circuit supply duct indicated generally at 40 comprises a duct portion 40a open at one end to receive a charging gas, such as air, as indicated by arrow 48. The duct portion 40a carries the heat reclaim/solar collector 49 permitting the air to be heated. The air is moved by a blower 41 at the discharge end of the heat reclaim/solar collector 49 to a charging circuit supply duct portion 40b which opens through valves 11, 21 and 31 within branch ducts to storage bins 10, 20 and 30, respectively. The charging system return duct indicated generally at 45 includes a portion 45c which, by way of suitable branch ducts, connects to the storage bins 10, 20 and 30 by way of their lower walls 4 and through gate valves 12, 22 and 32. The charging system return duct 45 further includes a portion 45b which extends parallel, and in contact with the charging system supply duct portion 40a, and within which is incorporated a regenerative heat exchanger 47 such that the inlet air as at 48 is preheated prior to entering the heat reclaim/solar collector 49. The regenerative heat exchange results from the return air discharging up some of its retained heat to the atmosphere, as indicated at 46 at the terminal end of the charging circuit return duct portion 45b. Under charging conditions, one or more of the bins 10, 20 or 30 would have their charging circuit supply duct and return duct valves open, while the gate valves leading to the withdrawal circuit would be closed for all storage bins being charged at that time.

In this respect, assuming that gate valves 11 and 12 are open and all other gate valves for the storage bins 10, 20 and 30 are closed, charging air represented by arrow 42, and having a relatively low humidity such as coming from a dry source or after being heated by the heat reclaim/solar collector 49 which may, for instance, be any source of heat at around 60° F. above the intake temperature of the charging air as at 48 is directed to storage bin 10 under pressure by operation of blower 41. The gate valves, as well as system blowers, are automatically controlled whenever the temperature and humidity of the charging air, as evidence by arrow 42, is suitable for drying the material in any one of the bins 10, 20, 30, etc. The hot, low humidity air 42 passes through the supply duct portion 40b, gate valve 11, storage bin 10, and over the desiccant material, such as silica gel M, and exits through gate valve 12, through charging circuit return duct 45 for discharge as at 46. While passing through the silica gel desiccant material M in bin 10, it picks up moisture from the storage material and becomes cooler and retains more water vapor than when it enters the bin. Since water vapor would deter the process if circulated back through the heat source 49, it is discharged to the atmosphere at 46. However, some of the retained heat is preferably recovered by use of the regenerative heat exchanger 47 which couples supply duct portion 40a and return duct portion 45b of the charging circuit.

When the charge in bin 10 has reached its highest practical value for current conditions in supply duct 40, the gate valves 11 and 12 are closed to seal the dry material for storage within storage bin 10 without further losses until the stored energy is needed under demand as determined by the withdrawal circuit. The withdrawal circuit includes means for selectively withdrawing energy from the bin having the highest indicated charge, with the bin having the lowest indicated charge being selected for charging; for instance, bin 20, in which case, gate valves 21 and 22 are open with gate valves 23 and 24 closed and permitting dry air from the heat reclaim/solar collector 49 to dry the silica gel stored within storage bin 20. The system is said to operate such that heat is charged within the bins having the lowest charge at the time, and heat is delivered from the one having the highest charge. Turning to the withdrawal circuit, its principal duct components are the withdrawal circuit supply duct 53 and the withdrawal circuit return duct 52. The withdrawal circuit return duct 52 is provided with a first duct portion 52a which includes a branch portion opening to the storage bins through the lower walls 4 and carrying withdrawal circuit return duct gate valves: 13 for storage bin 10, 23 for storage bin 20, and 33 for storage bin 30. Further, the return duct 52 of the withdrawal circuit is provided with a second duct portion 52b which is open at one end 103 to the outside with air as a source of gas to be directed under pressure through the storage bin for heating by way of giving off its moisture to the very dry desiccant material M with a selected storage bin which has been previously charged. Thus, when energy is to be withdrawn, depending on whether hot, cool or dry air is desired at the output, air from a suitable source, such as outside air via opening 103 of return duct section 52b is drawn into duct 52 by a blower 51 which forms a portion of the withdrawal circuit supply duct 53 and the given bin that is open for energy withdraw. For instance, if bin 30, which is fully charged, is to supply thermal energy, it is necessary that valves 31 and 32 be closed for that bin and that valves 33 and 34 be open to permit the air to pass from duct 52 to duct 53. The air gives up some of its moisture to the dry storage material M within bin 30, becoming hotter and dryer, while the storage material M becomes wetting in giving up some of its stored energy. The air, in giving up moisture, becomes hotter, and as long as the material in the bin 30 is dry enough for the purpose at hand, withdraw continues from that bin. Another bin, such as bin 10 or 20, having the next highest charge at the time, will be switched in when bin 30 is exhausted. The employment of more than two bins is advantageous in flexibility while storing, charging or withdrawing.

When the object of heat withdrawal is for drying, such as for drying clothes, paint finishes, hay, seeds or any other similar process, the hot, dry air may be withdrawn from duct 53 through inclined duct 55, as evidenced by arrow 56, by selective control of a flap or gate valve as at 55a.

The system of the present invention, in the illustrated embodiment, is directed primarily to maintaining desired temperature conditions within the room R. In this case, the withdrawal circuit further comprises a supply duct 54 at the discharge side of blower 51 which opens to a heat exchange chamber 63. Chamber 63 carries a counterflow heat exchange coil 61 such that where the dryness of the air is not a factor and it is preferred simply to extract free heat from the storage and to supply it to the room being conditioned, the coil 61 is employed. In this respect, the room R is connected by way of ducts 104 and 105 to bypass duct 106, the duct 106 incorporating a heat exchange coil 64a within the same. The heat exchange coil 64a is pipe connected to heat exchange coil 61. Coils 61 and 64a are directly connected such that the heat extracted from the air flow within duct 54 leading from the storage bin is transmitted to the air circulated to and from the room R through duct 106. Pipe 108 leads from the counterflow heat exchange coil 61 to the room heat exchange coil 64a via pipe 109 within which a control valve 110 is located for controlling the flow of a working fluid between these heat exchange coils. Alternatively, a second valve 111 within pipe or line 108 downstream of line 109 may be open while valve 110 is closed to permit the hot working fluid to be delivered to some other end-use device or processing equipment, as indicated by arrow 94. A pipe or line 112 leads from the room heat exchange coil 64a to the hot end of a third counterflow air preheat exchange coil 68 mounted within the withdrawal circuit return duct portion 52b upstream of the air inlet 103. Line or pipe 113 leads from the cold end of that counterflow heat exchange coil to the cold end of the counterflow heat exchange coil 61 of heat exchange chamber 60, with coils 61, 64a and 68 being in a closed series loop. A pump 66 may be incorporated within line 113 to effect positive pressure flow of the working fluid within that closed loop. Thus, after most of the heat is depleted from the working fluid within the room heat exchanger, heat exchange coil 64a, the still warm fluid passes through pipe 112 to the heat exchange coil 68 and thereby extracts as much heat as possible from the hot air within the supply duct 53 of the withdrawal circuit.

When the outside air humidity is not high enough to extract sufficient heat from the desiccant to carry the thermal demand, it is preferred that environmentally warm water is sprayed into the input air before it passes over heat exchange coil 68. In that regard, a spray nozzle indicated at 99 effects the spraying of water on the incoming outside air, as indicated by arrows 114. Up to 500 BTU's may be extracted from a fully charged storage bin for each pound of desiccant material within that storage bin.

The illustrated embodiment permits selective cooling to be achieved for the space to be conditioned or for other space at the same time that heat is being withdrawn for a useful purpose. In that respect, in duct 54 downstream of the heat exchange chamber, the water spray 71 sprays water as at W onto the air flowing from the heat exchange coil 61 and towards the discharge end 115 of duct 54. Duct 105 intersects duct 54 and is provided with a flap valve 98 which is maintained either in the dotted-line or full-line position. When in the full-line position, the cool air is discharged from end 115 of duct 54, as indicated by arrow 6, and may be employed for refrigeration purposes, for booster cooling of a mechanical absorption refrigeration condensor to take some of the load off the compressor during peak load period on the utility line, or for any process needing cooling below ambient temperature.

When the flap valve 98 is in the dotted-line position, the cool air may be directed to the room or space R to be conditioned. Under such conditions, it is preferred that valve 110 is closed and valve 111 open so that there is no simultaneous heating and cooling of the room, heat exchange having been terminated within the room heat exchange coil 64a by closure of valve 110. Under such conditions, the hot working fluid within line 108 passes to an end-use device and fresh make-up water must be provided, as indicated by arrow 95, to pipe 113 at point 116 for passage to the counterflow heat exchange coil 61 within heat exchange chamber 62.

During those periods when heat from the withdrawal circuit is not needed, the heat may be dissipated to the environment as when valve 98, is closed, arrow 6, to passage 105.

The withdrawal circuit is further provided with a return duct portion 52c which constitutes an extension of the duct 104 leading from the room to duct 106, duct portion 52c intersecting duct portion 52a commonly with duct portion 52b. At this point, there is provided a flap valve 91 which may take the full-line or dotted-line position. In the dotted-line position, outside air is cut off to the withdrawal circuit, and air returning from cooling of the room R which has an advantage over temperature and humidity of the outside air is returned to the bins, whereby a portion of its moisture is given up to the charged desiccant material, with the air being heated and returned to the heat exchange chamber 62. No water spray or vapor need be added to this recirculated air because of the humidity provided to the same during evaporative cooling within the spray chamber 70.

The system is highly versatile and permits refrigeration down to the near freezing point with little additional loss in efficiency of withdrawal because the return air will be boosted each time it passes through the desiccant, cooling and humidifying cycle. Such moist storage, resulting from psychometric cooling will be far better for refrigeration and storage of lettuce and other vegetables because it would have no tendency to dry out leaves and delicate skins of sensitive plants, such as normally occurs by air cooled by evaporative coils or mechanical refrigeration. Cut flowers would fair much better in such refrigerated air whose humidity may be maintained near the 100% level.

From the above, it is readily apparent that the thermal energy storage heating and cooling system of the present invention is of a simplified and compact nature. In addition to returning heat as desired, dry air may be provided for various processes, and conversion of the heated air to cooling can be achieved with little additional equipment and with minimal loss of energy as compared to common conversion methods. Small volume storage may hold many times as much energy as thermal storage using water, and the weight compared to water is almost as favorable as its volume ratio. One cubic foot of activated aluminate weighs only about 50 pounds compared to 64 pounds for water, and it holds roughly 18,000 BTU's. The temperature of water correspondingly would have to be raised to around 300° F. to match the properties of activated aluminate. Loose stones would have to be heated to at least 600° F. to store a comparable amount of heat. Where the desiccant comprises silica gel which weighs about 40 pounds per cubic foot and can hold up to 24,000 BTU's, the advantages of the present system can be readily appreciated, particularly since the silica gel may be stored in a charged condition without thermal insulation at any temperature without loss.

Additional advantages reside for thermal energy storage during cold whether since the desiccants can collect energy at any temperature, and once dried can translate that advantage to an entirely different range of temperatures to release their stored energy. As an example, on a day when it is only moderately sunny and where the outside temperature is about 0° F. and the collector 49 can only get a rise of 90° without operating inefficiently, it has little advantage for storing usable heat in conventional thermal storage. However, with the desiccant system of the present invention, the collector can be run at a somewhat more efficient temperature of around 60° and still dry the desiccant material M to its maximum. After a storage bin is charged by drying and is sealed by closure of the gate valves, the cold outside temperature does not deplete the charge because it is not in the form of sensible heat. At the time of withdrawal of energy, the outside air is drawn in, is sprayed with the warmest environmental water available and the moistened air with possible ice crystals is passed over a heat exchanger to warm it to near room conditions as by heat exchange coil 68, and then it is passed into the storage bin to give up its moisture and to be heated. The heating from the storage starts from the temperature of the input air so it is relatively easy to obtain temperatures above 100° F. Further, almost the full charge of any one of the bins may be withdrawn within the temperature range of the space or device to be heated, such as room R.

Temperatures below ambient may be developed down to near the depression of the desiccant by cooling the gas coming out of storage to the ambient temperature with one heat exchanger, exposing the partially cooled gas to evaporative cooling and passing the spent cooling back into storage for drying and heating again through a second heat exchanger.

While the illustrated embodiment employs blowers for the forced circulation of a gas, such as air, through both the charging and withdrawal circuit, it is obvious that such positive flow devices may be replaced by thermal siphon means or the like. Further, while gate valves are employed for selectively closing off and sealing the storage bins to respective supply and return ducts for the charging and withdrawal circuits, alternative devices may be employed.

While the invention has been described with reference to a preferred embodiment thereof, it will be understood by those skilled in the art that various changes in form and details may be made therein without departing from the spirit and scope of the invention.

What is claimed is:

1. A thermal energy storage system comprising:
   (a) at least three enclosed isolatable storage bins;
   (b) desiccant material within said at least three storage bins to provide for the prolonged storage of energy in the form of dryness of the desiccant material, said energy being derived from an unreliable or discontinuous source of heat;
   (c) a charging circuit for varying the moisture content of said desiccant material by circulating a heated, dry gas through at least one of said bins and over said desiccant material to cause said desiccant material to give up moisture to said charging circuit gas and to render said desiccant material to a dry, charged state wherein said charging circuit includes a supply duct which is open at one end to the atmosphere and includes a heat reclaim/solar collector therein for raising the temperature of the ambient air entering said charging circuit supply duct, and said charging circuit includes a return duct which discharges to the atmosphere;
   (d) a withdrawal circuit connected to said at least three bins including means for selectively varying the moisture content of the desiccant material by circulating a moisture laden gas through said charged desiccant material to cause said gas to reject moisture to the desiccant material and to thereby raise the gas temperature within said withdrawal circuit;
   (e) valve means for isolating said bins from said charging and withdrawal circuits; and
   (f) means for detecting and selectively withdrawing energy from a bin having the highest indicated charge and charging a bin having the lowest indicated charge.

2. The thermal energy storage system as claimed in claim 1 wherein said charging circuit return duct includes a portion mounted adjacent to and in contact with a portion of said charging circuit supply duct, and wherein said system further includes a regenerative heat exchanger interposed between said duct portions such that the air entering said charging circuit supply duct is preheated prior to entering said heat reclaim/solar collector.

3. The thermal energy storage system as claimed in claim 1 wherein said withdrawal circuit includes a circuit supply duct and a return duct, said return duct having a portion which is open to the atmosphere for supplying air to the interior of said at least three storage bins such that passage of ambient air through said withdrawal circuit return duct and said bins causes, by moisture release to said desiccant material a temperature increase to create relatively hot, dry air for passage through said withdrawal circuit supply duct, said withdrawal circuit supply duct further includes a heat exchanger chamber downstream of said at least three storage bins, and said heat exchanger chamber includes a first heat exchanger coil carrying a working fluid in thermal energy transfer relation with respect to said gas flowing therethrough to remove heat from the gas flowing therethrough such that the gas discharging from said withdrawal circuit supply duct downstream of said heat exchanger chamber constitutes relatively dry, cool air.

4. The thermal energy storage system as claimed in claim 1 further comprising a spray chamber within said withdrawal circuit supply duct downstream of said heat exchanger chamber, said spray chamber including means for spraying water vapor on the gas flowing therethrough so as to increase the humidity of said relatively cool gas discharging from said heat exchanger chamber.

5. The thermal energy storage system as claimed in claim 4 further comprising a room to be conditioned, a room supply duct connecting said withdrawal circuit supply duct to said room and intersecting said room supply duct downstream of said spray chamber, and selectively operable valve means at said intersection for selectively effecting discharge of cool air from said spray chamber through the outlet end of said supply duct or through said room supply duct leading to said space to be conditioned.

6. The thermal energy storage system as claimed in claim 5 further comprising a second exchange coil operatively coupled to said room supply duct connecting said space to be conditioned to said withdrawal circuit supply duct, and means for circulating a working fluid between first and second heat exchanger coils within said heat exchanger chamber and said room supply duct, respectively, for causing the air circulating within said duct leading to said space to be conditioned, to be heated in response to cooling of the air flowing through said withdrawal circuit supply duct and said heat exchanger chamber.

7. The thermal energy storage system as claimed in claim 6 wherein said withdrawal circuit return duct comprises a water spray intermediate of the end of that duct open to the atmosphere, and said at least three storage bins for humidifying the ambient air prior to entering said storage bin.

8. The thermal energy storage system as claimed in claim 7 further comprising a third heat exchanger coil positioned within said withdrawal circuit return duct between the inlet opening to said atmosphere and said at least three storage bin and downstream of said water spray, and being fluid connected in series with said heat exchanger chamber and said room heat exchanger coil to form a closed series loop in that order, and pump means within the series loop for pumping a working fluid through said first, second and third heat exchanger coils to cause said working fluid to absorb heat from the air flowing through said withdrawal circuit supply duct and within said heat exchanger chamber, and to dissipate heat to the air passing over said second and third heat exchanger coils.

9. The thermal energy storage system as claimed in claim 8 wherein said withdrawal circuit return duct comprises intersecting portions connected to said room to be conditioned and to the discharge end of the return duct housing said third heat exchanger coil, and a valve means within said withdrawal circuit return duct for selectively effecting fluid communication between said storage bins and the atmosphere while blocking fluid communication between said storage bin and said room to be conditioned, and vice versa.

10. The thermal energy storage system as claimed in claim 1 further comprising blower means within said charging and withdrawal circuits for effecting forced circulation of air, at least through said heat reclaim/solar collector and said heat exchanger chamber.

* * * * *